United States Patent Office 3,454,523
Patented July 8, 1969

3,454,523
POLY-ALPHA-OLEFINS CONTAINING A
STABILIZER COMPOSITION
Clarence E. Tholstrup, Kingsport, Tenn., assignor to Eastman Kodak Company, Rochester, N.Y., a corporation of New Jersey
No Drawing. Continuation-in-part of application Ser. No. 218,519, Aug. 22, 1962. This application June 6, 1966, Ser. No. 555,225
The portion of the term of the patent subsequent to May 8, 1979, has been disclaimed
Int. Cl. C08f 45/58
U.S. Cl. 260—45.8           2 Claims

ABSTRACT OF THE DISCLOSURE

A stabilizer composition for stabilizing polymeric materials, particularly polyolefins, comprising (A) a 2,6-dialkyl-p-cresol of the formula:

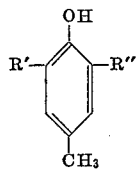

wherein R' and R" each are alkyl radicals having 12 to 18 carbon atoms;

(B) a dialkyl thiodialkanoate of the formula:

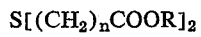

wherein R is an alkyl radical having 10 to 20 carbon atoms and $n$ is 2 or 3; and (C) a phenyl salicylate of the formula:

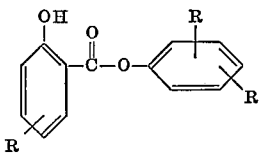

wherein each R is independently hydrogen or an alkyl radical having 1 to 22 carbon atoms;

with or without a dialkylpentaerythritol diphosphite.

DISCLOSURE

This is a continuation-in-part of Ser. No. 218,519, filed Aug. 22, 1962, now abandoned.

This invention relates to normally solid poly-alpha-olefins and to the problem of protecting them against oxidative degradation.

Normally solid polymers of alpha-olefins, generally referred to herein as poly-alpha-olefins, such as, for example, normally solid polyethylene, normally solid polypropylene and the like, are prone to oxidative degradation. This is particularly true at elevated temperatures, that is, at temperatures above 20° C. This degradation involves rupture of the polymer chains and formation of carbonyl ($=C=O$) groups. Evidence of such degradation in its early stages is the presence of peroxides. As this degradation progresses, articles and coatings containing these polymers at large concentrations tend to crack, become brittle, and lose tensile strength to the extent of mechanical failure.

Normally solid poly-alpha-olefins are commonly exposed to elevated temperatures in making useful compositions and articles out of resins containing them, and also in normal uses of some of these compositions and articles. Thus, such customary processing procedures as roll compounding, injection molding, extrusion and the like involve elevated temperatures. In such end uses as electrical insulation, protective coatings for electrical wire, plastic pipes for hot water and steam, and the like, elevated temperatures are frequently normally encountered. Hence, when normally solid poly-alpha-olefins and compositions containing them are subjected to these procedures and employed in such end uses, oxidative degradation of the poly-alpha-olefins takes place.

It is common practice, therefore, to incorporate into poly-alpha-olefins additives which have been found to function in ways which inhibit or suppress oxidative degradation of poly-alpha-olefins. These additives are broadly referred to as stabilizers. There is a need, however, for more effective stabilizers and combinations of stabilizers.

The poly-alpha-olefin stabilizer composition of this invention comprises a synergistic mixture of a 2,6-dialkyl-p-cresol in which each alkyl has 12 through 18 carbon atoms, a dialkyl thiodialkanoate and a phenylsalicylate. The synergistic mixture can also contain a dialkylpentaerythritoldiphosphite.

The 2,6-dialkyl-p-cresol is a compound according to the following general formula:

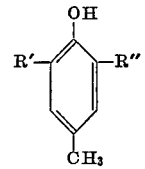

wherein R' and R" are alkyl radicals having from 12 to 18 carbon atoms. Typical of these 2,6-dialkyl-p-cresols are:

2,6-di(n-octadecyl)-p-cresol
2,6-di(1-methylheptadecyl)-p-cresol
2(1-methylheptadecyl)-6(n-dodecyl)-p-cresol
2,6-didodecyl-p-cresol Relative concentration of the 2,6-dialkyl-p-cresol in the synergistic mixture of this invention broadly is in a range from about 0.002 to about 99% by weight of the mixture, generally is in a range from about 0.05 to about 35% by weight of the mixture and preferably is in a range from about 0.08 to about 15% by weight of the mixture.

The dialkyl thiodialkanoate is a compound according to the following formula:

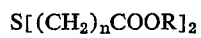

wherein R is an alkyl radical having at least 4 carbon atoms, generally 4–22 carbon atoms and preferably 8–18 carbon atoms, and *n* is an integer from 2 to 3. Examples of a dialkyl thiodialkanoate are:

dibutyl 3,3'-thiodipropionate
dihexyl 3,3'-thiodipropionate
dioctyl 3,3'-thiodipropionate
didecyl 3,3'-thiodipropionate
dilauryl 3,3'-thiodipropionate
dimyristyl 3,3'-thiodipropionate
dipentadecyl 3,3'-thiodipropionate
dioctadecyl 3,3'-thiodipropionate
dieicosyl 3,3'-thiodipropionate
didocosanyl 3,3'-thiodipropionate
dibutyl 4,4'-thiodibutyrate
dioctyl 4,4'-thiodibutyrate
dilauryl 4,4'-thiodibutyrate
dipentadecyl 4,4'-thiodibutyrate
dioctadecyl 4,4'-thiodibutyrate
didocosanyl 4,4'-thiodibutyrate Relative concentration of the dialkyl thiodialkanoate in the synergistic mixture of this invention is broadly in a range from about 0.002 to about 99% by weight of the mixture, generally from about 0.05 to about 35% by weight of the mixture and preferably from about 0.08 to about 15% by weight of the mixture.

The phenylsalicylate is a compound according to the following formula:

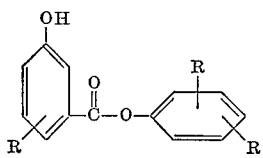

wherein each R is a member independently selected from the group consisting of the hydrogen radical and alkyl radicals having 1–22 carbon atoms. Typical compounds of this formula include:

phenylsalicylate
p-tert-butylphenylsalicylate
octylphenylsalicylate
(1,1,3,3-tetramethylbutyl)phenylsalicylate
nonylphenylsalicylate
dodecylphenylsalicylate
octadecylphenylsalicylate
(1-methylheptadecyl)phenylsalicylate
tert-butylphenyl 5-tert-butylsalicylate
tert-octylphenyl 5-tert-butylsalicylate
dodecylphenyl 5-tert-butylsalicylate
octadecylphenyl 5-tert-butylsalicylate
octylphenyl 5-tert-octylsalicylate
octylphenyl 5-dodecylsalicylate
octadecylphenyl 5-tert-octylsalicylate
octadecylphenyl 5-octadecylsalicylate
(1-methylheptadecyl)phenyl 5-(1-methylheptadecyl)-salicylate
o,o'-dimethylphenylsalicylate
o,o'-dimethylphenyl 5-tert-butylsalicylate
o,p-dimethylphenyl 5-tert-butylsalicylate
o,o'-bis(octadecyl)phenylsalicylate
o,p-bis(octadecyl)phenylsalicylate Concentration of the phenylsalicylate in the synergistic mixture of this invention is broadly in a range from about 0.002 to about 99% by weight of the mixture, generally in a range from about 50 to about 95% by weight of the mixture and preferably from about 70 to about 90% by weight of the mixture.

The dialkylpentaerythritoldiphosphite component in a preferred embodiment of the synergistic mixture of this invention is a compound according to the formula:

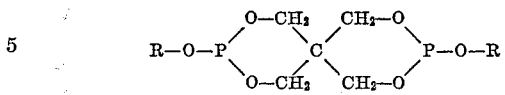

wherein each R is an alkyl radical having 10–22 carbon atoms. Typical examples of a dialkylpentaerythritoldiphosphite include:

didecylpentaerythritoldiphosphite
didodecylpentaerythritoldiphosphite
dipentadecylpentaerythritoldiphosphite
dioctadecylpentaerythritoldiphosphite
didocasanylpentaerythritoldiphosphite Concentration of the dialkylpentaerythritoldiphosphite in this preferred embodiment of the synergistic mixture of this invention is broadly in a range from about 0.003 to about 99% by weight of the mixture, generally in a range from about 0.02 to about 35% by weight of the mixture and preferably from about 0.08 to about 15% by weight of the mixture.

The normally solid poly-alpha-olefin composition of this invention consists essentially of a normally solid resin portion and at an effective concentration the synergistic composition of this invention. The normally solid resin portion consists essentially of at least one normally solid, poly-alphaolefin polymer.

The normally solid, poly-alpha-olefin polymer is a polymer derived from an alpha-monoolefinic hydrocarbon having 2–10 carbon atoms. Such a polymer is provided by the normally solid homopolymers of alpha-monoolefinic hydrocarbons having generally 2–10 carbon atoms, preferably 2–6 carbon atoms and usually 2–4 carbon atoms. It is also provided by the normally solid copolymers (which include graft polymers, addition polymers, block polymers and the like) of alpha-monoolefinic hydrocarbons having generally 2–10 carbon atoms, preferably 2–6 carbon atoms and usually 2–4 carbon atoms, as well as of these alphamonoolefinic hydrocarbons and other compounds. Examples of a normally solid polymer derived from an alpha-monoolefinic hydrocarbon having 2–10 carbon atoms include the linear and branched, low density and high density, crystalline and amorphous, normally solid, homopolymers and copolymers of ethylene, propylene, butene-1, isobutylene, pentene-1, 2-methylpentene-1, 3-methylbutene-1, hexene-1, 3,3-dimethylbutene-1, heptene-1, octene-1, nonene-1, decene-1, 4-methylpentene-1, 4-methylhexene-1, 5-ethylhexene-1, 6-methylheptene-1, 6-ethylheptene-1, styrene, allyl benzene and the like. Processes for preparing a normally solid poly-alpha-olefin polymer are well known and described in detail in the prior art. See, for example, the U.S. patent, No. 2,153,553, to Fawcett et al., the U.S. patent, No. 2,912,-429, to Cash and the U.S. patent, No. 2,917,500, to Hagemeyer et al. In general, a normally solid, poly-alphaolefin, is a thermoplastic material which at 20° C. is solid. It includes the so-called poly-alpha-olefin waxes which usually have average molecular weights in a range from about 3,000 to about 12,000.

The normally solid resin portion of the poly-alpha-olefin composition of this invention, in addition to at least one normally solid, poly-alpha-olefin polymer, can also comprise other polymeric components. Thus, it can comprise a normally solid polymer derived from another alpha-monoolefinic hydrocarbon having 2–10 carbon atoms. It can comprise a different kind of polymer, generally present as a physical property improver.

The normally solid, poly-alpha-olefin compositions of this invention can also comprise other antioxidants, ultraviolet light inhibitors, anticorrosion additives, antistatic agents, foaming agents, plasticizers, pigments, waxes, mold release agents, slip agents, fillers, extenders and the like including physical property improvers other than polymeric compounds.

Concentration of the synergistic mixture of this invention in the poly-alpha-olefin composition in general depends on the degree of stabilization desired. This in turn depends upon processing conditions and subsequent environmental conditions to which the poly-alpha-olefin composition is intended to be exposed. In general, however, a concentration broadly in a range from about 0.003 to about 40% by weight of the total poly-alpha-olefin polymeric content of the composition, generally in a range from about 0.03 to about 20% by weight of the total poly-alpha-olefin polymeric content of the composition and preferably in a range from about 0.03 to about 12% by weight of the total poly-alpha-olefin polymeric content of the composition is an effective concentration for most end uses of the compositions. Such a concentration amounts to a concentration of each of the individual components of the synergistic mixture being broadly in a range from about 0.001 to about 10% by weight of the total poly-alpha-olefin polymeric content of the composition, generally in a range from about 0.01 to about 5% by weight of the total poly-alpha-olefin polymeric content of the composition and preferably in a range from about 0.01 to about 3% by weight of the total poly-alpha-olefin polymeric content of the composition. Preferred concentration for the 2,6-dialkyl-p-cresol and dialkyl thiodialkanoate is 0.001 to 1% and for the phenylsalicylate 0.001 to 2%.

The normally solid, poly-alpha-olefin composition of this invention is prepared by incorporating the components of the synergistic mixture, either in admixture or individually, into the normally solid, resin portion of the composition. Generally, such incorporation is performed by any one of a number of known methods, such as roll compounding, extrusion, solvent mixing and the like. For example, such incorporation can be performed by heating or otherwise softening the normally solid resin portion to a workable consistency and then working in, as by roll compounding, the individual components of the synergistic mixture until a substantially uniform blend or dispersion is obtained. Generally, such incorporation takes place at the same time that other additives are normally incorporated into the resin portion of the composition and usually along with such other additives as the particular poly-alph-olefin composition formulation may require.

The poly-alpha-olefin composition of this invention is useful in coatings and as a material of construction for shaped articles. Thus, the composition can be made into various shaped articles such as, for example, pellets, sheeting, films, bars, tubes, filaments, fibers, specially shaped structural elements and the like as by conventional casting and molding techniques which include extrusions, blow-molding and the like.

This invention is further illustrated by the following examples of various aspects thereof, including preferred specific embodiments of the invention. This invention is not limited to the specific embodiments unless otherwise indicated.

Specific embodiments of the poly-alpha-olefin composition of this invention are formulated as follows:

Example 1.—Polypropylene composition

| Components: | Parts by weight |
| --- | --- |
| Resin portion— | |
| Normally solid polypropylene | 1000 |
| Additives portion— | |
| 2,6-di(tert-butyl)-p-cresol | 1 |
| Lilauryl 3,3'-thiodipropionate | 3 |
| p-Tert-octylphenylsalicylate | 10 |

Example 2.—Polypropylene composition

| Components: | Parts by weight |
| --- | --- |
| Resin portion— | |
| Normally solid polypropylene | 1000 |
| Additives portion— | |
| 2,6-didoceyl-p-cresol | 1 |
| Dilauryl 3,3'-thiodipropionate | 1 |
| p-Tert-octylphenylsalicylate | 10 |

Example 3.—Polypropylene composition

| Components: | Parts by weight |
| --- | --- |
| Resin portion— | |
| Normally solid polypropylene | 1000 |
| Additives portion— | |
| 2,6-bis(1-methylheptadecyl)-p-cresol | 1 |
| Dilauryl 3,3'-thiodipropionate | 1 |
| p-Tert-octylphenylsalicylate | 10 |

Example 4.—Polypropylene composition

| Components: | Parts by weight |
| --- | --- |
| Resin portion— | |
| Normally solid polypropylene | 1000 |
| Additive portion— | |
| 2,6-bis(1-methylheptadecyl)-p-cresol | 1 |
| Dilauryl 4,4'-thiodibutyrate | 1 |
| p-Tert-octylphenylsalicylate | 10 |

Example 5.—Polypropylene composition

| Components: | Parts by weight |
| --- | --- |
| Resin portion— | |
| Normally solid polypropylene | 1000 |
| Additives portion— | |
| 2,6-bis(1-methylheptadecyl)-p-cresol | 1 |
| Dilauryl 3,3'-thiodipropionate | 1 |
| p-Octadecylphenylsalicylate | 10 |

Example 6.—Polypropylene composition

| Components: | Parts by weight |
| --- | --- |
| Resin portion — | |
| Normally solid polypropylene | 1000 |
| Additives portion— | |
| 2,6-bis(1-methylheptadecyl)-p-cresol | 1 |
| Dilauryl 3,3'-thiodipropionate | 1 |
| p-Tert-octylphenylsalicylate | 10 |
| Distearylpentaerythritoldiphosphite | 1 |

Example 7.—Polypropylene composition

| Components: | Parts by weight |
| --- | --- |
| Resin portion— | |
| Normally solid polypropylene | 1000 |
| Additives portion— | |
| 2,6-bis(1-methylheptadecyl)-p-cresol | 1 |
| Dilauryl 3,3'-thiodiopropionate | 1 |
| p-Octadecylphenylsalicylate | 10 |
| Distearylpentaerythritoldiphosphite | 1 |

Example 8.—Polypropylene composition

| Components: | Parts by weight |
| --- | --- |
| Resin portion— | |
| Normally solid polypropylene | 1000 |
| Additives portion— | |
| 2,6-didodecyl-p-cresol | 1 |
| Dilauryl 3,3'-thiodipropionate | 1 |
| p-Tert-octylphenylsalicylate | 10 |
| Distearylpentaerythritoldiphosphite | 1 |

Example 9.—Poly(butene-1) composition

| Components: | Parts by weight |
|---|---|
| Resin portion— | |
|   Normally solid poly(butene-1) | 1000 |
| Additives portion— | |
|   2,6-bis(1-methylheptadecyl)-p-cresol | 0.5 |
|   Dilauryl 3,3'-thiodipropionate | 1 |
|   p-Tert-octylphenylsalicylate | 10 |

Example 10.—Poly(butene-1) composition

| Components: | Parts by weight |
|---|---|
| Resin portion— | |
|   Normally solid poly(butene-1) | 1000 |
| Additives portion— | |
|   2,6-bis(1-methylheptadecyl)-p-cresol | 0.5 |
|   Dilauryl 3,3'-thiodiproprionate | 1 |
|   p-Tert-octylphenyl 5-tert-butylsalicylate | 10 |

Example 11.—Poly(butene-1) composition

| Components: | Parts by weight |
|---|---|
| Resin portion— | |
|   Normally solid poly(butene-1) | 1000 |
| Additives portion— | |
|   2,6-bis(1-methylheptadecyl)-p-cresol | 0.5 |
|   Dilauryl 3,3'-thiodipropionate | 1 |
|   p-Tert-octylphenylsalicylate | 10 |
|   Distearylpentaerythritoldiphosphite | 1 |

Example 12.—Propylene-butene-1 copolymer composition

| Components: | Parts by weight |
|---|---|
| Resin portion— | |
|   Normally solid copolymer of propylene and butene-1, the weight ratio of propylene content to butene-1 content being 90:1 | 1000 |
| Additives portion— | |
|   2,6-bis(1-methylheptadecyl)-p-cresol | 0.5 |
|   Dilauryl 3,3'-thiodiproprionate | 1 |
|   p-Tert-octylphenylsalicylate | 10 |

Example 13.—Propylene-butene-1 copolymer composition

| Components: | Parts by weight |
|---|---|
| Resin portion— | |
|   Normally solid copolymer of propylene and butene-1, the weight ratio of propylene content to butene-1 content being 90:1 | 1000 |
| Additives portion— | |
|   2,6-bis(1-methylheptadecyl)-p-cresol | 0.5 |
|   Dilauryl 3,3'-thiodipropionate | 1 |
|   p-Tert-octylphenylsalicylate | 10 |
|   Distearylpentaerythritoldiphosphite | 1 |

Example 14.—Propylene-isoprene polyallomer composition

| Components: | Parts by weight |
|---|---|
| Resin portion— | |
|   Normally solid propylene-isoprene polyallomer, the weight ratio of propylene content to isoprene content being 1000:7 | 1000 |
| Additives portion— | |
|   2,6-bis(1-methylheptadecyl)-p-cresol | 0.5 |
|   Dilauryl 3,3'-thiodipropionate | 1 |
|   p-Tert-octylphenylsalicylate | 10 |

The propylene-isoprene polyallomer called for in the formulation of this example and in the formulation of the following example is a normally solid, crystalline polymer made as by first polymerizing propylene to form a crystalline, propylene polymer and then copolymerizing said propylene polymer with isoprene until the resulting product has an isoprene content of about 0.7% by weight.

Example 15.—Propylene-isoprene polyallomer composition

| Components: | Parts by weight |
|---|---|
| Resin portion— | |
|   Normally solid propylene-isoprene polyallomer, the weight ratio of propylene content to isoprene content being 1000:7 | 1000 |
| Additives portion— | |
|   2,6-bis(1-methylheptadecyl)-p-cresol | 0.5 |
|   Dilauryl 3,3'-thiodipropionate | 1 |
|   p-Tert-octylphenylsalicylate | 10 |
|   Distearylpentaerythritoldiphosphite | 1 |

The specific compositions of the foregoing formulations are each prepared by banding the resin portion of the composition on hot milling rolls, the temperature of the front roll being at 330° F. and the temperature of the rear roll being at 280° F. As soon as the resin portion has reached a workable consistency, the components of the additives portion of the formulations are then added to the resin portion on the rolls and milled thereby into the resin portion. Addition of the additives portion is as rapid as possible so as to keep the total milling time to a total of about six minutes. At the end of this time, the resulting poly-alpha-olefin composition is stripped from the rolls and then granulated. If desired, the granulated composition is then cast, molded or extruded into the desired article.

The stabilities of these specific, poly-alpha-olefin resin compositions of this invention, and thus the stability of the general poly-alpha-olefin composition of this invention, relative to oxidative degradation, are demonstrated by the following tabulated test data obtained in the stability testing of these and other poly-alpha-olefin compositions. The stability test and procedure thereof employed in this testing are as follows:

160° C. Oven Life Test.—In this test, 0.25 gram specimens (½ inch by ½ inch by ¹⁄₁₆ inch) are cut from a compression molded plate (8 inches by 8 inches by ¹⁄₁₆ inch) of the sample, and placed on separate 25 millimeter watch glasses. These specimens are stored in a forced air oven at a temperature of 160° C. Periodically, one of the specimens is removed and analyzed as follows for the presence of peroxides.

The specimen is cut into 6–10 pieces and transferred to a 250 milliliter flask containing 20 milliliters of carbon tetrachloride. The pieces are digested in the carbon tetrachloride for 25 minutes over a steam bath and with frequent agitation. This aids the extraction of peroxides from the pieces since the resin portion of the pieces is not soluble in carbon tetrachloride. To the flask are then added 20 milliliters of a mixture of glacial acetic acid and chloroform at a volumetric ratio of glacial acetic acid to chloroform of 3:2, and 1 milliliter of saturated, aqueous, potassium iodide. The flask is stoppered and agitated for 2 minutes in subdued light. To the resulting reaction mixture in the flask are added 100 milliliters of distilled water. One milliliter of starch is added as a color indicator for iodine which is liberated by the peroxides. The presence of peroxides is indicated by the mixture having a blue color.

As soon as a blue color is detected upon analysis of one of the specimens, the time is noted. The time interval in hours during which specimens of the test sample were in the oven is then determined. This time interval is the 160° C. oven life of the sample.

Table I summarizes the formulation and stability test data of test samples of various polypropylene compositions. The polypropylene used in making up these samples was a commercially available, normally solid, polypropylene characterized by a density of 0.91, an I.V. at 145° C. of 1.96 and molecular weight greater than 15,000. The test samples were prepared by the procedure described in connection with, and following, the examples.

TABLE I

| Sample No. | Additives | Additive Concentrations In percent by wt. of Poly-alpha-olefin | 160° C. Oven Life In Hours |
|---|---|---|---|
| 1 | None | | 03 |
| 2 | 2,6-di(tert-butyl)-p-cresol | 0.1 | <4 |
| 3 | Dilauryl 3,3'-thiodipropionate | 0.1 | <4 |
| 4 | p-Tert-octylphenylsalicylate | 1 | <4 |
| 5 | {2,6-di(tert-butyl)-p-cresol / Dilauryl 3,3'-thiodipropionate} | 0.1 / 0.3 | 15 |
| 6 | {2,6-di(tert-butyl)-p-cresol / p-Tert-octylphenylsalicylate} | 0.1 / 1 | <4 |
| 7 | {Dilauryl 3,3'-thiodipropionate / p-Tert-octylphenylsalicylate} | 0.1 / 1 | <10 |
| 8 | {2,6-di(tert-butyl)-p-cresol / Dilauryl 3,3'-thiodipropionate / p-Tert-octylphenylsalicylate} | 0.1 / 0.3 / 1 | 48 |
| 9 | 2,6-didodecyl-p-cresol | 0.1 | 15 |
| 10 | {2,6-didodecyl-p-cresol / Dilauryl 3,3'-thiodipropionate} | 0.1 / 0.1 | 155 |
| 11 | {2,6-didodecyl-p-cresol / p-Tert-octylphenylsalicylate} | 0.1 / 1 | <17 |
| 12 | {2,6-didodecyl-p-cresol / Dilauryl 3,3'-thiodipropionate / p-Tert-octylphenylsalicylate} | 0.1 / 0.1 / 1 | 210 |
| 13 | 2,6-bis(1-methylheptadecyl)-p-cresol | 0.1 | 15 |
| 14 | {2,6-bis(1-methylheptadecyl)-p-cresol / Dilauryl 3,3'-thiodipropionate} | 0.1 / 0.1 | 170 |
| 15 | {2,6-bis(1-methylheptadecyl)-p-cresol / p-Tert-octylphenylsalicylate} | 0.1 / 1 | 17 |
| 16 | {2,6-bis(1-methylheptadecyl)-p-cresol / Dilauryl 3,3'-thiodipropionate / p-Tert-octylphenylsalicylate} | 0.1 / 0.1 / 1 | >240 |
| 17 | Dilauryl 4,4'-thiodibutyrate | 0.1 | 4 |
| 18 | {2,6-bis(1-methylheptadecyl)-p-cresol / Dilauryl 4,4'-thiodibutyrate / p-Tert-octylphenylsalicylate} | 0.1 / 0.1 / 1 | >240 |
| 19 | p-Octadecylphenylsalicylate | 1 | 4 |
| 20 | {2,6-bis(1-methylheptadecyl)-p-cresol / p-Octadecylphenylsalicylate} | 0.1 / 1 | 17 |
| 21 | {2,6-bis(1-methylheptadecyl)-p-cresol / Dilauryl 3,3'-thiodipropionate / p-Octadecylphenylsalicylate} | 0.1 / 0.1 / 1 | >240 |
| 22 | Distearylpentaerythritoldiphosphite | 0.1 | <4 |
| 23 | {2,6-bis(1-methylheptadecyl)-p-cresol / Distearylpentaerythritoldiphosphite} | 0.1 / 0.1 | <18 |
| 24 | {Dilauryl 3,3'-thiodipropionate / Distearylpentaerythritoldiphosphite} | 0.1 / 0.1 | 5 |
| 25 | {p-Tert-octylphenyl-salicylate / Distearylpentaerythritoldiphosphite} | 1 / 0.1 | <10 |
| 26 | {2,6-bis(1-methylheptadecyl)-p-cresol / Dilauryl 3,3'-thiodipropionate / Distearylpentaerythritoldiphosphite} | 0.1 / 0.1 / 0.1 | 190 |
| 27 | {2,6-bis(1-methylheptadecyl)-p-cresol / p-Tert-octylphenyl-salicylate / Distearylpentaerythritoldiphosphite} | 0.1 / 1 / 0.1 | <20 |
| 28 | {2,6-bis(1-methylheptadecyl)-p-cresol / Dilauryl 3,3'-thiodipropionate / p-Tert-octylphenyl-salicylate / Distearylpentaerythritoldiphosphite} | 0.1 / 0.1 / 1 / 0.1 | >280 |
| 29 | {2,6-bis(1-methylheptadecyl)-p-cresol / Dilauryl 3,3'-thiodipropionate / p-Octadecylphenyl-salicylate / Distearylpentaerythritoldiphosphite} | 0.1 / 0.1 / 1 / 0.1 | >280 |
| 30 | {2,6-didodecyl-p-cresol / Dilauryl 3,3'-thiodipropionate / p-Tert-octylphenyl-salicylate / Distearylpentaerythritoldiphosphite} | 0.1 / 0.1 / 1 / 0.1 | 270 |

Samples 8, 12, 16, 18, 21, 28, 29 and 30 in Table I correspond in formulation to the compositions of Examples 1–8, respectively.

These data of Table I demonstrate the outstanding effectiveness of the specific embodiments of the synergistic mixture of this invention in stabilizing polypropylene and thus poly-alpha-olefins generally, as compared to the individual components in these embodiments of the mixture and to other combinations of these components. In particular, these data of Table I illustrate the synergism of the components of the synergistic mixture of this invention. Stability after more than a certain number of hours, e.g., >240 hours, indicates that the composition of the invention was still stable when the test was terminated after a standard period. These compositions apparently exhibit stability substantially greater than normally measured in standard test periods.

Table II summarizes the formulation and testing stability data of test samples of various poly(butene-1) compositions. The poly(butene-1) resin used in each sample was from a batch of a normally solid poly(butene-1) characterized by a density of 0.91, an I.V. at 145° C. of 1.9 and molecular weight greater than 15,000. These test samples were prepared by the general procedure of the examples.

TABLE II

| Sample No. | Additives | Additive Concentrations in percent by wt. of Poly-alpha-olefin | 160° C. Oven Life In Hours |
|---|---|---|---|
| 1 | None | | 0.5 |
| 2 | 2,6-bis(1-methylheptadecyl)p-cresol | 0.05 | <15 |
| 3 | Dilauryl 3,3'-thiodipropionate | 0.1 | 1 |
| 4 | {2,6-bis(1-methylheptadecyl)-p-cresol / Dilauryl 3,3'-thiodipropionate} | 0.05 / 0.1 | 160 |
| 5 | p-Tert-octylphenylsalicylate | 1 | <3 |
| 6 | {2,6-bis(1-methylheptadecyl)-p-cresol / p-Tert-octylphenylsalicylate} | 0.05 / 1 | <15 |
| 7 | {Dilauryl 3,3'-thiodipropionate / p-Tert-octylphenylsalicylate} | 0.1 / 1 | <4 |
| 8 | {2,6-bis(1-methylheptadecyl)-p-cresol / Dilauryl 3,3'-thiodipropionate / p-Tert-octylphenylsalicylate} | 0.05 / 0.1 / 1 | 205 |
| 9 | p-Tert-octylphenyl 5-tert. butylsalicylate | 1 | <3 |
| 10 | {2,6-bis(1-methylheptadecyl)-p-cresol / Dilauryl 3,3'-thiodipropionate / p-Tert-octylphenyl 5-tert. butylsalicylate} | 0.05 / 0.1 / 1 | 215 |
| 11 | Distearylpentaerythritoldoldiphosphite | 0.1 | <2 |
| 12 | {Dilauryl 3,3'-thiodipropionate / Distearylpentaerythritoldiphosphite} | 0.1 / 0.1 | <4 |
| 13 | {p-Tert-octylphenylsalicylate / Distearylpentaerythritoldiphosphite} | 1 / 0.1 | <6 |
| 14 | {2,6-bis(1-methylheptadceyl) p-cresol / p-Tert-octylphenylsalicylate / Distearylpentaerythritoldiphosphite} | 0.05 / 1 / 0.1 | <16 |
| 15 | {2,6-bis(1-methylheptadecyl) p-cresol / Dilauryl 3,3'-thiodipropionate / p-Tert-octylphenylsalcylate / Distearylpentaerythritoldiphosphite} | 0.05 / 0.1 / 1 / 0.1 | 255 |

In Table II samples 8, 10 and 15 correspond in formulation to the compositions of Examples 9–12, respectively.

The test data of Table II demonstrate the outstanding effectiveness of the specific embodiments of the synergistic mixture of this invention in stabilizing poly(butene-1) and thus poly-alpha-olefins generally. In addition, the data of Table II demonstrate the synergism of the components of the synergistic mixture of this invention.

Table III summarizes the formulation and stability testing data of test samples of various propylene-butene-1 copolymer compositions. Samples of these compositions were prepared in accordance with the general procedure of the foregoing examples, from a batch of propylene-butene-1 copolymer characterized by a weight ratio of propylene content to butene-1 content of 90:1, a density of 0.91, an I.V. at 145° C. of 2.6 and a molecular weight of the copolymer greater than 15,000.

TABLE III

| Sample No. | Additives | Additive Concentrations in percent by wt. of Poly-alpha olefin | 160° C. Oven Life In Hours |
|---|---|---|---|
| 1 | None | | 0.2 |
| 2 | 2,6-bis(1-methylheptadecyl)-p-cresol. | 0.05 | <15 |
| 3 | Dilauryl 3,3'-thiodipropionate | 0.1 | <2 |
| 4 | p-Tert-octylphenylsalicylate | 1 | <3 |
| 5 | 2,6-bis(1-methylheptadecyl)-p-cresol. | 0.05 | 150 |
|   | Dilauryl 3,3'-thiodipropionate | 0.1 | |
| 6 | Dilauryl 3,3'-thiodipropionate | 0.1 | 5 |
|   | p-Tert-octylphenylsalicylate | 1 | |
| 7 | 2,6-bis(1-methylheptadecyl)-p-cresol. | 0.05 | 210 |
|   | Dilauryl 3,3'-thiodipropionate | 0.1 | |
|   | p-Tert-octylphenylsalicylate | 1 | |
| 8 | Distearylpentaerythritoldiphosphite. | 0.1 | <5 |
| 9 | 2,6-bis(1-methylheptadecyl)-p-cresol. | 0.05 | 240 |
|   | Dilauryl 3,3'-thiodipropionate | 0.1 | |
|   | p-Tert-octylphenylsalicylate | 1 | |
|   | Distearylpentaerythritoldiphosphite. | 0.1 | |

Samples 7 and 9 of Table III correspond in formulation to the specific compositions of Examples 12 and 13, respectively. The data of this table demonstrate the outstanding effectiveness of specific embodiments of the synergistic mixture of this invention in stabilizing a poly-alpha-olefin. In particular, these data demonstrate synergism in poly-alpha-olefin stabilization on the part of the components of the synergistic mixture of this invention.

Table IV summarizes the formulation and stability testing data of test samples of various propylene-isoprene polyallomer compositions. The propylene-isoprene polyallomer compositions were prepared in accordance with the general procedure of the examples from a batch of propylene-isoprene polyallomer having a propylene content of 99.3% by weight, an isoprene content of 0.7% by weight, a density of 0.91, an I.V. at 145° C. of 1.8 and molecular weight greater than 15,000.

TABLE IV

| Sample No. | Additives | Additive Concentrations In percent by wt. of Poly-alpha-olefin | 160° C. Oven Life In Hours |
|---|---|---|---|
| 1 | None | | 0.3 |
| 2 | 2,6-bis(1-methylheptadecyl)-p-cresol. | 0.05 | <15 |
| 3 | Dilauryl 3,3'-thiodiproprionate | 0.1 | <2 |
| 4 | p-Tert-octylphenylsalicylate | 1 | <3 |
| 5 | 2,6-bis(1-methylheptadecyl)-p-cresol. | 0.05 | 160 |
|   | Dilauryl 3,3'-thiodipropionate | 0.1 | |
| 6 | Dilauryl 3,3'-thiodipropionate | 0.1 | <5 |
|   | p-Tert-octylphenylsalicylate | 1 | |
| 7 | 2,6-bis(1-methylheptadecyl)-p-cresol. | 0.05 | 235 |
|   | Dilauryl 3,3'-thiodipropionate | 0.1 | |
|   | p-Tert-ocytlphenylsalicylate | 1 | |
| 8 | Distearylpentaerythritoldiphosphite. | 0.1 | 5 |
| 9 | 2,6-bis(1-methylheptadecyl)-p-cresol. | 0.05 | 265 |
|   | Dilauryl 3,3-thiodipropionate | 0.1 | |
|   | p-Tert-Octylphenylsalicylate | 1 | |
|   | Distearylpentaerythritoldiphosphite. | 0.1 | |

Samples 7 and 9 of Table IV correspond in formulation to the specific compositions of Examples 14 and 15, respectively. The data of Table IV also demonstrate the outstanding effectiveness of specific embodiments of the synergistic mixture of this invention. These data likewise demonstrate the synergism involved in stabilizing a poly-alpha-olefin by the synergistic mixture of this invention.

Thus, there is provided a new stabilizer composition which is especially useful for poly-alpha-olefins. A feature of advantage of the stabilizer mixture of this invention is that in poly-alpha-olefin compositions, it exhibits negligible discoloration. Still another feature of advantage of the stabilizer mixture of this invention is its effectiveness as an ultraviolet light inhibitor for poly-alpha-olefins.

In addition, there is provided a new poly-alpha-olefin composition having an outstanding degree of protection relative to oxidative degradation.

Other features, advantages and embodiments of this invention will occur to those in the exercise of ordinary skill in the art upon reading the foregoing disclosure. In this regard, while this invention has been described in considerable detail relative to specific embodiments thereof, variations and modifications of these embodiments can be effected within the spirit and scope of the invention as disclosed and claimed.

I claim:

1. A poly-α-olefin composition comprising polypropylene and a stabilizing amount of a synergistic stabilizer combination of 2,6-bis(1-methylheptadecyl)-p-cresol, p-tert.-octylphenylsalicylate and a compound selected from the group consisting of distearylthiodipropionate and dilaurylthiodipropionate.

2. A poly-α-olefin composition according to claim 1 wherein distearyl pentaerythritoldiphosphite is additionally included in said stabilizer combination.

References Cited

Derwent: Belgian Patents Report, vol. 1, No. 1, published May 1–15, 1961. Pertinent page: page A6, Belgian Patent 599,358 to Eastman Kodak Co.

DONALD E. CZAJA, *Primary Examiner.*

H. E. TAYLOR, JR., *Assistant Examiner.*

U.S. Cl. X.R.

260—28.5, 45.85, 45.95